(12) United States Patent
Forrester (10) Patent No.: US 6,885,336 B2
(45) Date of Patent: Apr. 26, 2005

(54) SYSTEMS AND METHODS FOR PROVIDING POSITION INFORMATION USING A WIRELESS COMMUNICATION DEVICE

(75) Inventor: Tim Forrester, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 10/046,959

(22) Filed: Jan. 14, 2002

(65) Prior Publication Data

US 2003/0132877 A1 Jul. 17, 2003

(51) Int. Cl.[7] .................................................. G01S 5/14
(52) U.S. Cl. .............................. 342/357.1; 342/357.09
(58) Field of Search .......................... 342/357.1, 357.09

(56) References Cited

U.S. PATENT DOCUMENTS

| | | | | |
|---|---|---|---|---|
| 5,739,786 A | * | 4/1998 | Greenspan et al. ...... | 342/357.1 |
| 5,877,724 A | * | 3/1999 | Davis ...................... | 342/357.1 |
| 5,945,944 A | * | 8/1999 | Krasner ................... | 342/357.1 |
| 6,002,363 A | * | 12/1999 | Krasner ................... | 342/357.1 |
| 6,081,229 A | * | 6/2000 | Soliman et al. ........ | 342/357.06 |
| 6,107,960 A | * | 8/2000 | Krasner ................... | 342/357.1 |
| 6,188,351 B1 | * | 2/2001 | Bloebaum ................ | 342/357.1 |
| 6,249,245 B1 | * | 6/2001 | Watters et al. ........... | 342/357.1 |
| 6,353,412 B1 | * | 3/2002 | Soliman .................. | 342/457 |
| 6,427,120 B1 | * | 7/2002 | Garin et al. ........... | 342/357.09 |
| 6,462,708 B1 | * | 10/2002 | Tsujimoto et al. ..... | 342/357.09 |
| 2003/0100333 A1 | * | 5/2003 | Standke et al. ............. | 455/426 |
| 2003/0107514 A1 | * | 6/2003 | Syrjarinne et al. ..... | 342/357.06 |

FOREIGN PATENT DOCUMENTS

GB    2347804 A  *  9/2000  ............ H04B/1/48

OTHER PUBLICATIONS

Continuous–Time Sigma–Delta Modulation for A/D Conversion in Radio Receivers, L. Breems et al., Kluwer Academic Publishers, p. v–27, 73–108, 143, Aug. 2001.*
B. Leung, Low power VLSI circuits for mobile communication, in Designing Low Power Digital Systems, Emerging Technologie chapter 4.3, p. 397–444, 1996.*
E.J. van der Zwan, A 10.7–MHz IF–to–baseband $\Sigma\Delta$ A/D conversion system for AM/FM radio receivers, IEEE Journal of Solid–State Circuits, vol. 35(12), p. 1810–1819, Dec. 2000.*
J. Haartsen, BLUETOOTH—The universal radio interface for ad hoc, wireless connectivity, Ericsson Review No. 3, 1998.*

* cited by examiner

*Primary Examiner*—Thomas H. Tarcza
*Assistant Examiner*—F H Mull (57) ABSTRACT

A wireless communication device comprises a transmitter configured to transmit wireless communication signals and a receiver. The receiver comprises a GPS receiver configured to receive GPS signals and a wireless communications receiver configured to receiver wireless communications signals. The wireless communication device also comprise a processor coupled with the receiver and the transmitter, the processor configured to process the GPS signals received by the GPS receiver and the wireless communications signals received by the wireless communication receiver, and to generate the wireless communication signals transmitted by the transmitter.

22 Claims, 11 Drawing Sheets

SYSTEMS AND METHODS FOR PROVIDING POSITION INFORMATION USING A WIRELESS COMMUNICATION DEVICE

RELATED APPLICATIONS INFORMATION

This application is related to U.S. patent application Ser. No. 09/898,269, entitled "System and Methods for Providing a GPS Enabled Antenna", filed Jul. 3, 2001, and to U.S. patent application Ser. No. 09/975,124, entitled "Mixer and IF Filter for GPS System" filed Oct. 8, 2001, both of which are incorporated herein by reference as if set forth in full.

BACKGROUND OF THE INVENTION

1. Field of the Invention

The invention relates generally to wireless communication and more particularly to systems and methods for obtaining position information using a wireless communication device.

2. Background

A traditional Global Positioning Technology (GPS) receiver receives and processes specially coded satellite communication signals. The Satellite signals are generated from an array of satellites that comprise the GPS system. Nominally, this array consists of 24 satellites arranged in various orbits such that between 5 and 8 satellites are visible from any point on earth. GPS receivers convert the satellite signals into position, velocity, and time estimates. Four satellites are required to compute the three position dimensions (x,y,z) as well as the time.

Today, GPS capability is frequently added to wireless communication handsets. Unfortunately, the GPS signals operate at different frequencies than those used for typical wireless communication. GPS signals operate in the 1500 MHz band, while in the U.S., wireless communication systems generally operate in the 800 MHz and 1900 Mhz bands. As a result, the GPS signals cannot be received using a wireless communication handset's antenna and receiver. Therefore, in order to add GPS capability to a handset, a separate antenna and receiver must be included in the handset.

There are generally two conventional ways to implement GPS capabilities in a wireless handset. The first is illustrated by exemplary communication system 100 in FIG. 1. System 100 comprises a wireless handset 106 in communication over communication channel 108 with a base station 110. By station 110, is, for example, at the center of a communication cell within a Wireless-Wide Area Network (W-WAN). Thus, handset 106 includes the requisite antenna and transceiver for communicating over communication channel 108. Again, communication channel 108 typically comprises signals in the 800 MHZ and/or 1900 MHz range.

Figure 1:
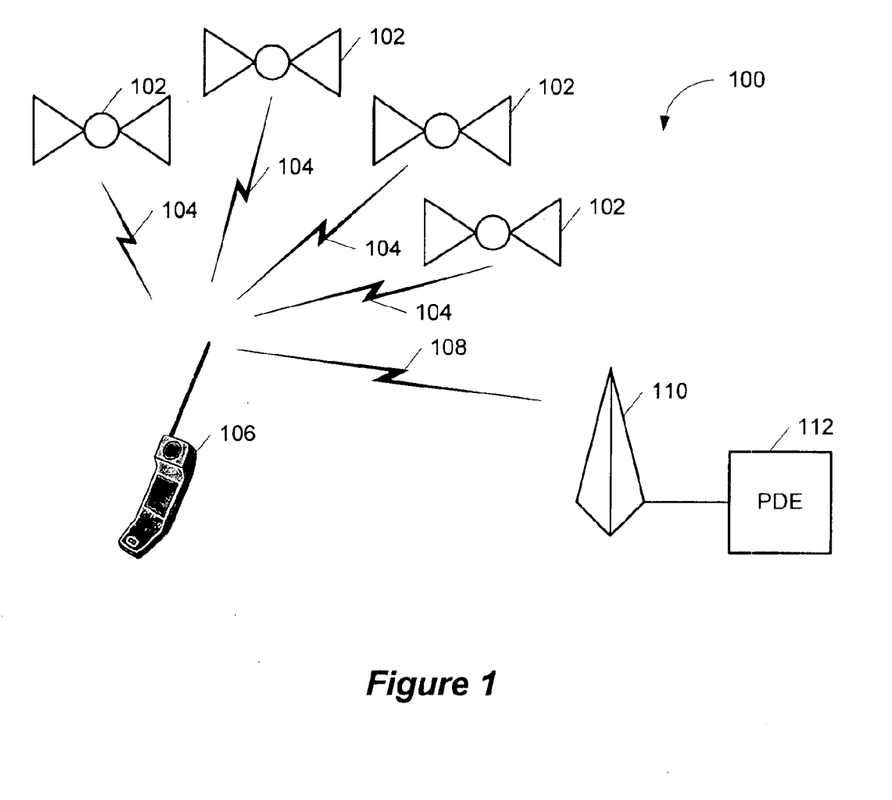
FIG. 1 is a diagram illustrating an exemplary wireless communication network comprising network based GPS capability.

Additionally, handset 106 is in communication with GPS satellites 102 over satellite communication channels 104. Thus, handset 106 also includes an antenna and associated GPS circuitry for receiving the satellite signals over satellite communication channels 104. In this implementation, the GPS circuitry decodes the satellite signals. The satellite signals are then sent to a Position Determination Entity (PDE) (112) interfaced with base station 110. PDE 112 determines the position of handset 106 from the decoded satellite signals and this information is transmitted back to handset 106, where it can, for example, be displayed n handset 106.

Thus, for example, if the subscriber wants to know his position, he can input a position request into handset 106. Handset 106 then acquires satellite signal information over satellite communication channels 104 using the GPS circuitry. The GPS circuitry decodes the satellite signals and handset 106 transmits the decoded signals to PDE 112 over communication channel 108. PDE 112 generates the position information from the decoded signals and transmits a position back to handset 106, where it is displayed to the subscriber on handset 106. PDE 112 can also be used to provide handset 106 with Access assist (AA) and sensitivity assist (SA) information to help handset 106 acquire satellites 102 over satellite communication channels 104.

By incorporating the GPS processing capabilities in PDE 112 instead of handset 106, the cost, complexity, and size of handset 106 can be reduced while offering enhanced GPS performance due to the greater computational power of the PDE. Since there is constant pressure to reduce the cost, complexity, and size of wireless communication headsets, this networked based approach has distinct advantages. There are, however, important disadvantages. First, for example, the network based approach increases the network traffic in system 100, which reduces system capacity, meaning fewer users can use the system. Second, the GPS capability only works when handset 106 is in range of system 100.

Figure 2:
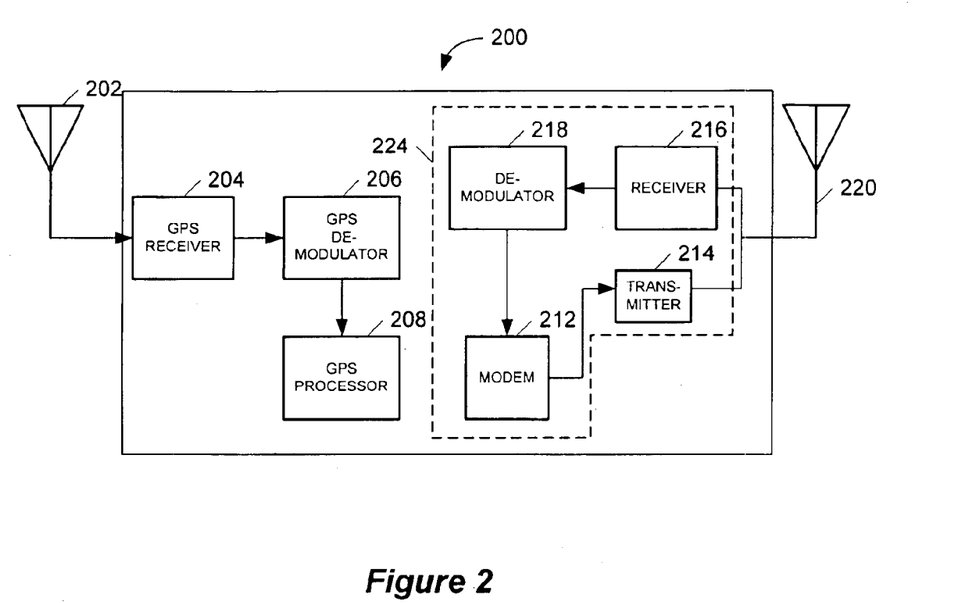
FIG. 2 is a logical block diagram of an exemplary wireless communication handset that incorporates a full GPS navigational system.

FIG. 2 illustrates a logical block diagram of an exemplary wireless handset 200 that can be used to illustrate a second way to implement GPS capabilities in a wireless handset, which overcomes the disadvantages of the implementation illustrated in FIG. 1. Handset 200 comprises an antenna 220 and wireless communication transceiver 224 configured to transmit and receive wireless communication signals, such as those that would be communicated over communication channel 108 in FIG. 1. Wireless communication transceiver 224 comprises receiver 216, which is configured to receive wireless communication signals from antenna 220, filter and amplify them, and then send them to demodulator 218. Demodulator 218 demodulates the received signal in order to generate a baseband information signal that is sent to modem 212. Historically, a modem comprised a modulator and a demodulator. However, a common definition for a modem is simply a modulator coupled with some signal processing functions. Within this patent, a modem is defined as modulator coupled with a processor. Transceiver 224 also includes transmitter 214, which is configured to transmit wireless communication signals via antenna 220 generated by Modem 212.

Typically, demodulator 210 comprises two stages; the first stage steps the frequency of a received signal down from a Radio Frequency (RF), used for transmitting signals over channel 108, to an Intermediate Frequency (IF). The IF frequency signal is then stepped down, in the second stage of demodulator 218, to baseband.

Modem 212 preferably includes various circuits for controlling the operation of handset 200 in general, and in particular for controlling communication using transceiver 224. Thus, Modem 212 can include various analog-to-digital (A/D) and digital-to-analog (D/A) converters, processors, Digital Signal Processors (DSPs), Vocoders, and peripheral control circuits as required by a particular handset 200. Alternatively, some or all of these circuits can be included in handset 200 as stand alone components or as components incorporated into the various components of transceiver 224.

In addition, handset 200 includes GPS processor 208 configured to process GPS signals received via antenna 202, which are filtered and amplified in GPS receiver 204 and demodulated in GPS demodulator 206. Thus, GPS processor 208 can generate position information when requested without the aid of a network based position determination. Accordingly, the implementation of FIG. 2 overcomes the problems associated with network position determination, such as increased traffic and a limited operating range. But, as mentioned, including a full GPS receiver in handset 200 drives up the cost, complexity, and size of handset 200 and can also have other negative affects such as reduced battery lifetime. As such, neither of the conventional solutions for incorporating GPS into a wireless communication handset is satisfactory.

SUMMARY OF THE INVENTION

In order to overcome the problems associated with conventional approaches for incorporating GPS into a wireless handset, the systems and methods for providing position information using a wireless communication device reuse various components of a wireless handset in order to reduce the overhead associated with including a GPS receiver. In particular, systems and methods are provided for configuring a wireless communication handset to use a single processor to process both GPS signals and wireless communication signals such that the handset can act as a standalone GPS receiver, without unduly increasing the size, complexity, and cost of the handset. Additional embodiments also reuse various other handset components to further decrease size, complexity, and cost, thus extending the benefits of the system and methods described herein.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 3:
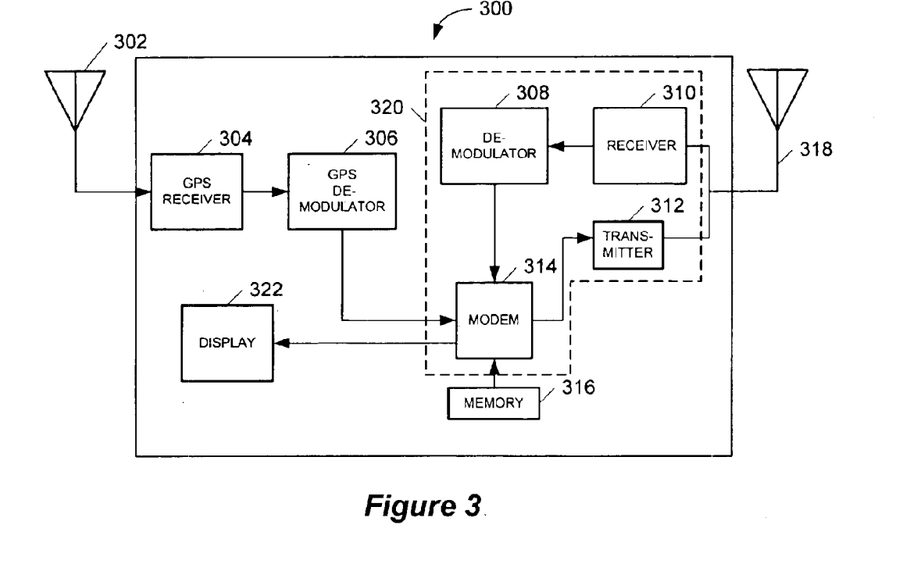
FIG. 3 is a logical block diagram of one example embodiment of a wireless communication handset that incorporates GPS capability in accordance with the invention.

FIG. 3 illustrates a logical block diagram of one example embodiment of a handset 300 that incorporates GPS capabilities using a single processor to process both GPS signals and wireless communication signals in accordance with the systems and methods described herein. Thus, handset 300 comprises an antenna 302 for receiving GPS signals. The received GPS signals can then be passed to a GPS receiver 304, where they can be filtered and amplified before being sent to GPS demodulator 306. The demodulated GPS signals are then sent to Modem 314 to be processed.

Modem 314 preferably comprises the circuits to interface with wireless communication transceiver 312. Thus, Modem 314 preferably controls communication via antenna 318 using transceiver 320, which means that Modem 314 generates signals to be transmitted by transmitter 312 and processes signals filtered and amplified by receiver 310 and demodulated by demodulator 308. In addition, however, Modem 314 includes the processing capability to generate position, velocity, and time estimates, for example, from the GPS signals received by antenna 302. Modem 314 can then, for example, be instructed to display such information on display 322 included in handset 300.

Preferably, a memory 316 is included in handset 300 to store instructions used by Modem 314 to control the operation of handset 300 generally, to process the GPS signals, and to control communication using transceiver 320. Memory 316 can comprise a single memory device or multiple memory devices as required. Memory 316 preferably comprises a primary non-volatile memory for storing instructions for use by Modem 314 and for storing information used by Modem 314 in executing the instructions. Additionally, memory 316 preferably includes a secondary memory used to store temporary information used by Modem 316. Thus, by storing the appropriate instructions and information in memory 316, Modem 314 can act as a GPS processor.

Accordingly, handset 300 can be configured to act as a GPS receiver independently of the presence of network coverage. Moreover, the cost and complexity of handset 300 is not increased as significantly as it would be if a complete standalone GPS navigational system were included in handset 300. Thus, the embodiment illustrated in FIG. 3 overcomes the problems associated with traditional approaches by incorporating GPS capability into handset 300 through the reuse of existing components. Moreover, the concept of component reuse can be extended even further to achieve greater reduction in size, complexity, and cost, while still incorporating full GPS capability into a handset.

Figure 4:
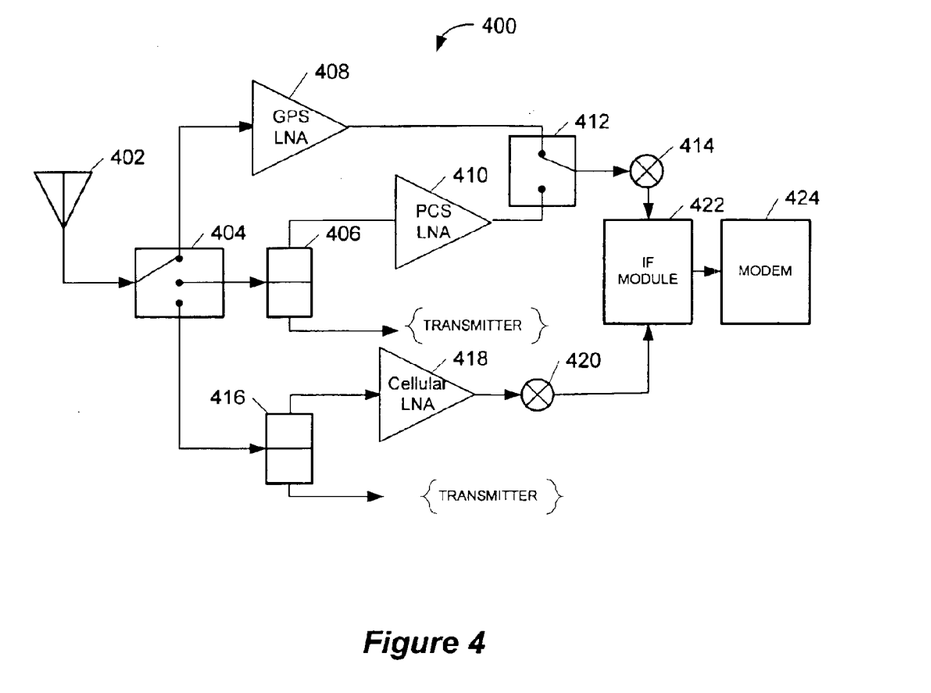
FIG. 4 is a logical block diagram illustrating another example embodiment of a wireless communication handset that incorporates GPS capability in accordance with he invention.

FIG. 4 illustrates a logical block diagram of another example embodiment of a handset configured in accordance with the systems and methods described herein in which more extensive reuse of components is implemented so as to further reduce size, complexity and cost. First, handset 400 uses a single antenna 402 to receive both GPS and wireless communication signals.

Figure 5:
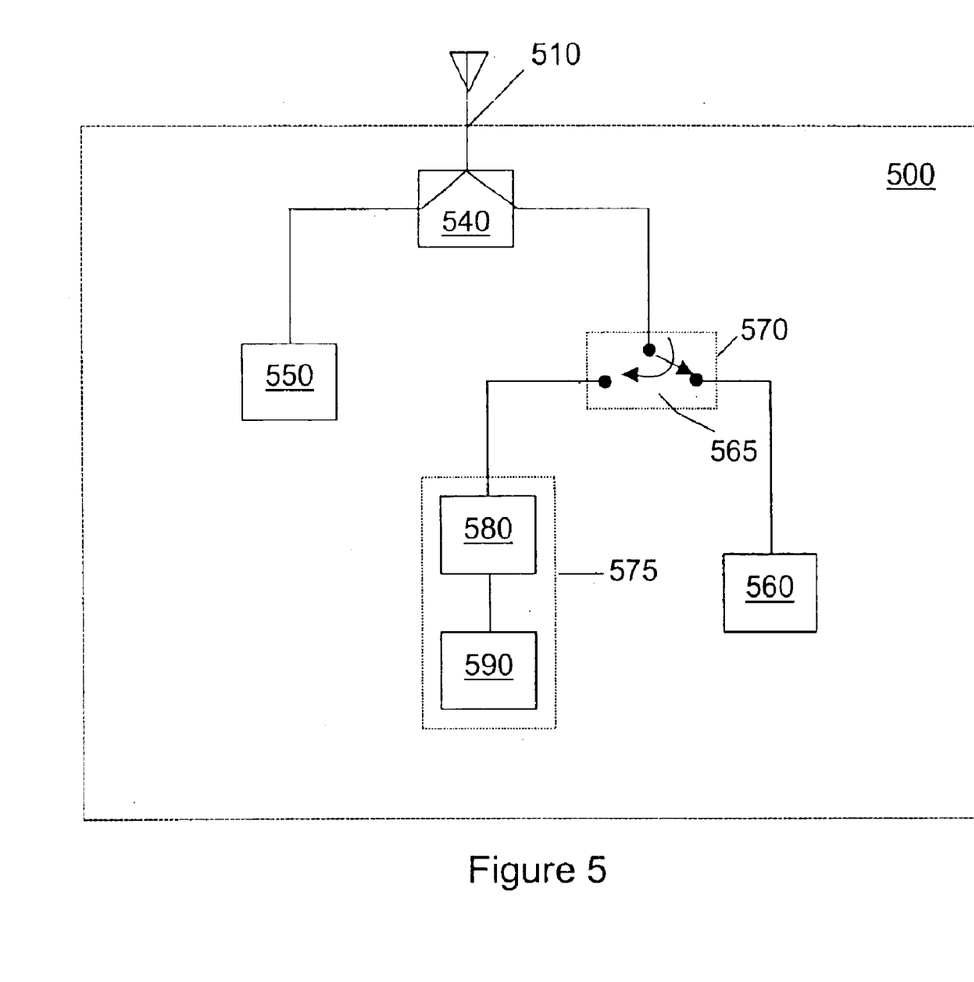
FIG. 5 shows selected components of an exemplary embodiment of a wireless communications device according to the present invention.
Figure 9:
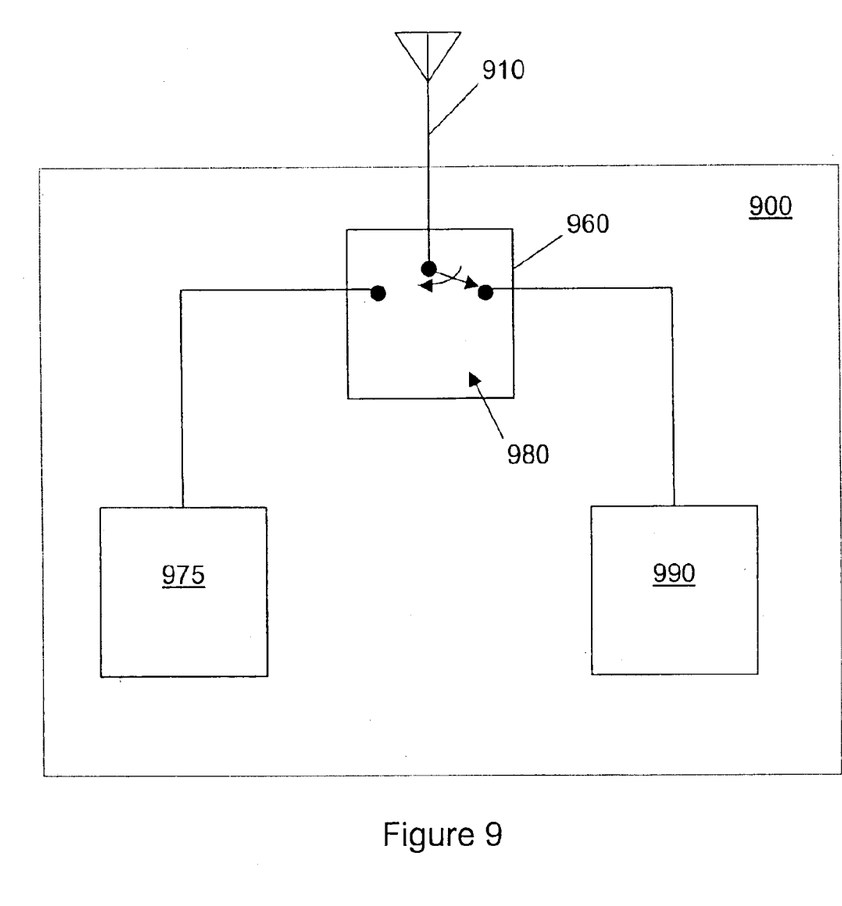
FIG. 9 shows selected components of yet another exemplary embodiment of the wireless communications device of FIG. 5 according to the present invention.

Before describing handset 400, however, systems and methods for using a single antenna to receive both GPS and wireless communication signals will be described. Accordingly, FIG. 5 illustrates a circuit for receiving a GPS signal using a conventional communication antenna 510 in wireless communication device 500. Wireless communication device 500 can include, for example, antenna 510, a diplexer 540, a first communication band, e.g., cellular band, duplexer 550, a second communication band, e.g., PCS band, duplexer 560, a GPS switching module 570 and a GPS module 575. As an alternative to diplexer 540, a two-way switch (as illustrated in FIG. 9) can also be used. As shown in FIG. 5, switching module 570 can include, for example, a switch 565. GPS module 575 can include, for example, an impedance matching module 580 coupled to a GPS Low Noise Amplifier (LNA) 590. Impedance matching module 580 and GPS LNA 590 can, for example, comprise part of GPS receiver 504. It will be appreciated that the circuit illustrated in FIG. 5 is for explanation only and that additional well-known circuitry must be added to construct a working wireless communication device 500.

As illustrated in FIG. 5, antenna 510 is coupled to diplexer 540. Diplexer 540 is coupled to first band duplexer 550. Diplexer 540 is also coupled to switching module 570. Switching module 570, in turn, is coupled to second communication band duplexer 560. Switching module 570 is also coupled to GPS module 575. In an exemplary embodiment, switching module 570 is coupled to an impedance matching module 580 within GPS module 575, which, in turn, is coupled to GPS LNA 590.

Again, although not shown, additional components can be included in the wireless communication device 500. For example, a GPS signal processor can be coupled to GPS LNA 590. In another example, transmitters and/or receivers can be coupled to duplexers 550 and 560. Such additional components are known and are not described here in detail.

A diplexer is typically used to direct communications signals responsive to a particular communication band or bands. For example, diplexer 540 separates a signal received on antenna 510 into a PCS path or cellular path. In operation, wireless communication signals in multiple wireless communication bands, e.g., the cellular and PCS bands, is received by antenna 510. Diplexer 540 splits the wireless communication signals into a first signal and a second signal. The first signal is filtered by a low pass filter portion of diplexer 540 and then coupled to first band duplexer 550. The second signal is filtered by a high pass filter portion of diplexer 540 and then coupled to switching module 570. First band duplexer 550 can then be configured to couple the first signal to, for example, a cellular receiver (not shown). In addition, the low pass filter portion blocks higher frequency band signals from passing to first band duplexer 550. High pass filter portion of diplexer 540 passes the second signal to second band duplexer 560 via switching module 570.

If the multiple received wireless communication signals also include, for example, GPS band signals, then the high pass filter portion passes, with some small amount of attenuation, the GPS band signals to GPS module 574 via switching module 570. When using a conventional antenna 510, the attenuation is caused, in part, because antenna 510 is not optimized for the GPS band. In GPS module 575, impedance matching module 580 provides an impedance match that is turned for the GPS band. GPS signals received from switching module 570 can then be amplified by GPS LNA 590 before being processed by conventional GPS circuitry (not shown).

The high pass filter portion of diplexer 540 also blocks lower frequency band signals. Wireless communication device 500 operates, in one example embodiment, with switching module 570 coupling diplexer 540 to duplexer 560. At a selected time or interval, however, it may be desirable to obtain position information. For example, position information can be useful when a user dials an emergency number. Wireless communication device 500 can also be running an application, such as a mapping application, where position is periodically needed. In another example, a user can instruct wireless communication device 500 to obtain position information. It will be appreciated that many applications exist for a wireless communication device 500 in which position information is useful.

When position information is needed, switching module 570 can be switched by control circuitry (not shown) to couple antenna 510 to GPS module 575. When configured in this manner, a GPS band signal at approximately 1575 MHz can be received by antenna 510 and transmitted to GPS module 575. Since antenna 510 is, for example, a dual-band antenna tuned to receive signals at approximately 800 MHz and at approximately 1900 MHz, the GPS signal at approximately 1575 MHz is unmatched. Accordingly, matching module 580 includes matching circuitry to more closely match the impedance between GPS module 575 and antenna 510 when it is receiving a GPS signal. As a result, a high quality GPS signal can be received and forwarded to GPS LNA 590.

Figure 6:
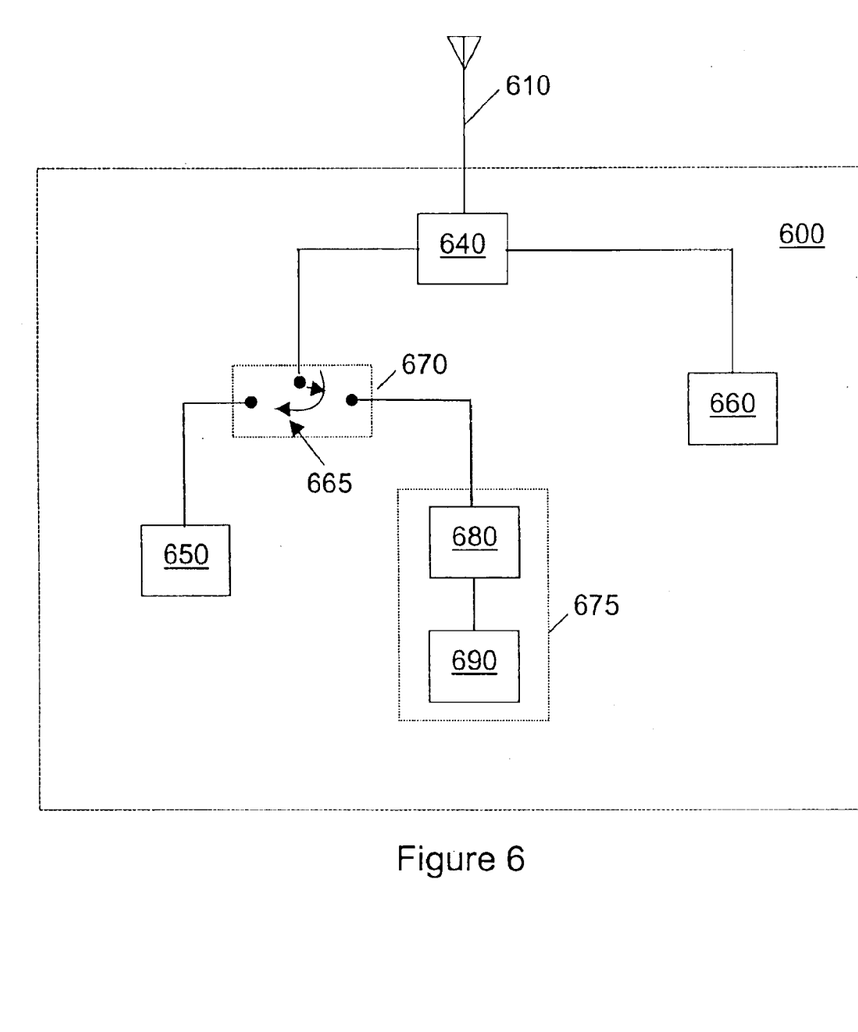
FIG. 6 shows selected components of another exemplary embodiment of the wireless communication device of FIG. 5 according to the present invention.

FIG. 6 illustrates example components of another example embodiment of a wireless communication device 600 configured too receive a GPS signal using a conventional antenna 610. The components are configured in a manner similar to those illustrated in FIG. 5, except the diplexer 640 separates a signal received by antenna 610 into a PCS path and a cellular/GPS path. Accordingly, switching module 670 is on the cellular/GPS path.

Figure 7:
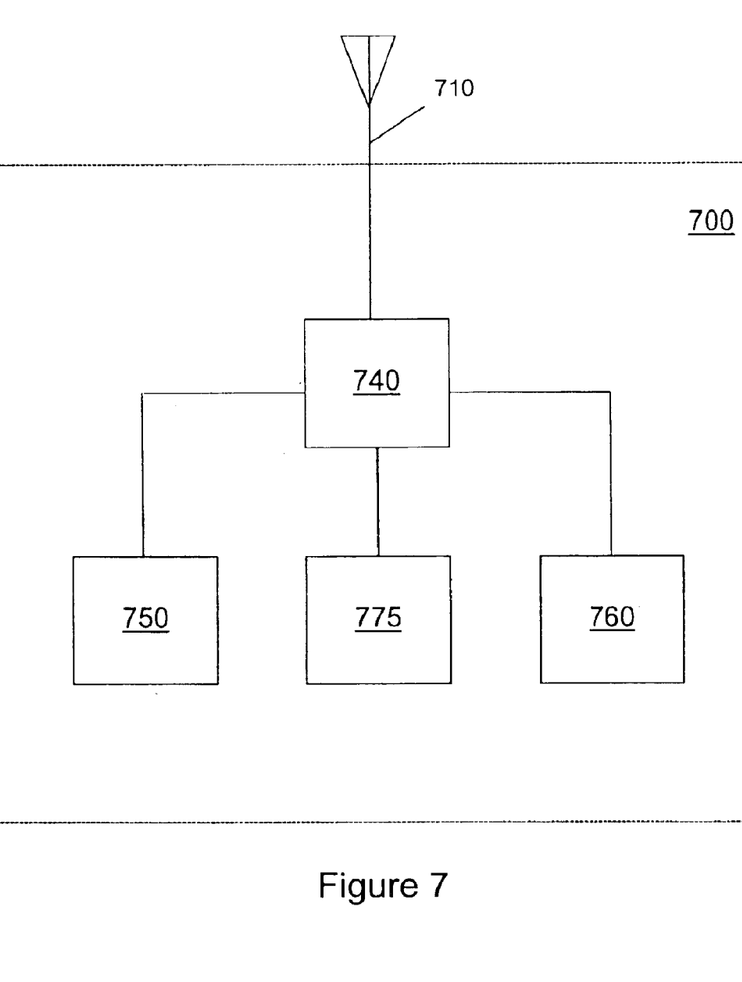
FIG. 7 shows selected components of another exemplary embodiment of the wireless communication device of FIG. 5 according to the present invention.

FIG. 7 illustrates exemplary components of another example embodiment of a wireless communication device 700 according to the systems and methods described herein. In the example embodiment of FIG. 7, wireless communication device 700 can include antenna 710, first band duplexer 750, second duplexer 760, GPS module 775, and a triplexer 740. Triplexer 740 couples antenna 710 to first communication band duplexer 750, a second communication band duplexer 760, and GPS module 175.

In operation, wireless communication signals are received by antenna 710. Triplexer 740 splits the received wireless communication signal into a first signal, a second signal, and a third signal. If the wireless communication signal includes, for example, cellular band communication signals, then a low pass filter portion of triplexer 740 passes the cellular band communication signals to first band duplexer 750. In addition, the low pass filter portion of triplexer 740 can be configured to block higher frequency band signals from passing to first band duplexer 750. If the wireless communication signal includes, for example, PCS band communication signals, then a high pass filter portion of triplexer 740 passes the PCS band communication signals to second band duplexer 760. In addition, the high pass filter portion can be configured to block lower frequency band from passing to second band duplexer 760. If the wireless communication signal includes, for example, GPS band signals, then a band pass filter portion of triplexer 740 passes the GPS band signals to GPS module 775.

GPS module 775, can include an impedance matching module 780 configured to match the received GPS signal. The GPS signal is then amplified by GPS LNA 790 before being processed by conventional GPS circuitry (not shown).

In addition, the band pass filter can be configured to block higher and lower frequency bands from passing to GPS module 775.

Figure 8:
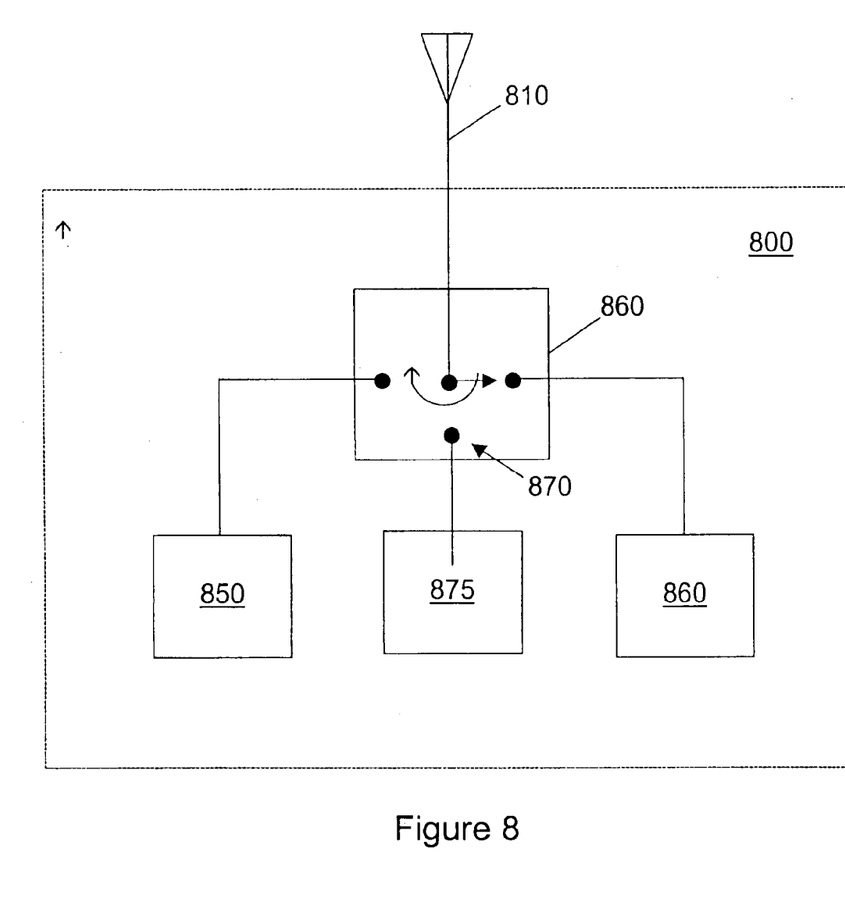
FIG. 8 shows selected components of another embodiment of the wireless communications device of FIG. 5 according to the present invention.

FIG. 8 illustrated another exemplary embodiment of a wireless communication device 800 in which a switching module 860 is used instead of triplexer 840. In this example embodiment, antenna 810 is coupled to first band duplexer 850, second band duplexer 860, and GPS module 875 via switching module 860. Switching module 860 can include, for example, a three-way switch 870. Switching module 860 can be controlled via a main controller (not shown) of wireless communications device 800 such as, for example, a processor, e.g., a mobile station modem (MSM).

Thus, for example, a cellular band signal can be switched by switching module 860 to first band duplexer 850; a PCS band signal can be switched to second band duplexer 860; and a GPS signal can be switched to GPS module 875. The cellular communications circuitry and the PCS communications circuitry can include, for example, band-optimized signal matching circuitry for use with the respective band.

FIG. 9 illustrates yet another exemplary embodiment of wireless communications device 900 configured in accordance with the systems and methods described herein. In this exemplary embodiment, wireless communication device 900 is configured to receive a GPS signal or a communication band signal, e.g., a cellular band signal or a PCS band signal. Antenna 910 is coupled to GPS module 975 and to communication band duplexes 990 via a switching module 960. Switching module 960 can include, for example, a two-way switch 980. Switching module 260 can be controlled via main controller (not shown) of wireless communication device 900 such as, for example, a processor, e.g., a MSM. Switching module 960 switches the signal received via antenna 910 to the appropriate output. Thus, for example, received cellular band signals can be switched to the communication band duplexer 990. Alternatively, a GPS signal can be switched to GPS module 975. The communication band circuitry can include, for example, band-optimized signal matching circuitry for use with the communications band.

Referring again to FIG. 4, a module 404 is used to direct signals received by antenna 402 to the appropriate receive circuitry. Module 404 can be a diplexer, a duplexer, a passive combiner or a switch module, as described above. Thus, when antenna 402 receives GPS signals, diplexer 404 will direct them to GPS LNA 408 where they can be amplified, for example. Typically, the GPS signals will also be filtered by a filter (not shown) in the GPS signal path. If, on the other hand, antenna 402 receives wireless communication signals, then diplexer 404 can direct these to duplexer 406. Duplexer 406 allows a transmitter (not shown) and receiver to be simultaneously connected to antenna 402 while maintaining sufficient isolation between the two to ensure that they do not interfere with each other. The principles of duplexer operation are well known. Thus, wireless communication signals received by antenna 402 can be directed through diplexer 404 and duplexer 406 to PCS LNA 410, where they can, for example, be amplified.

GPS LNA 408 and PCS LNA 410 can then send the signals to separate demodulators as explained in relation to handset 300 in FIG. 3. But further reuse can be achieved by using the same demodulator to demodulate both the wireless communication and GPS signals. Systems and methods for using a single demodulator for both GPS and wireless communication signals are described in relation to FIG. 10.

Figure 10:
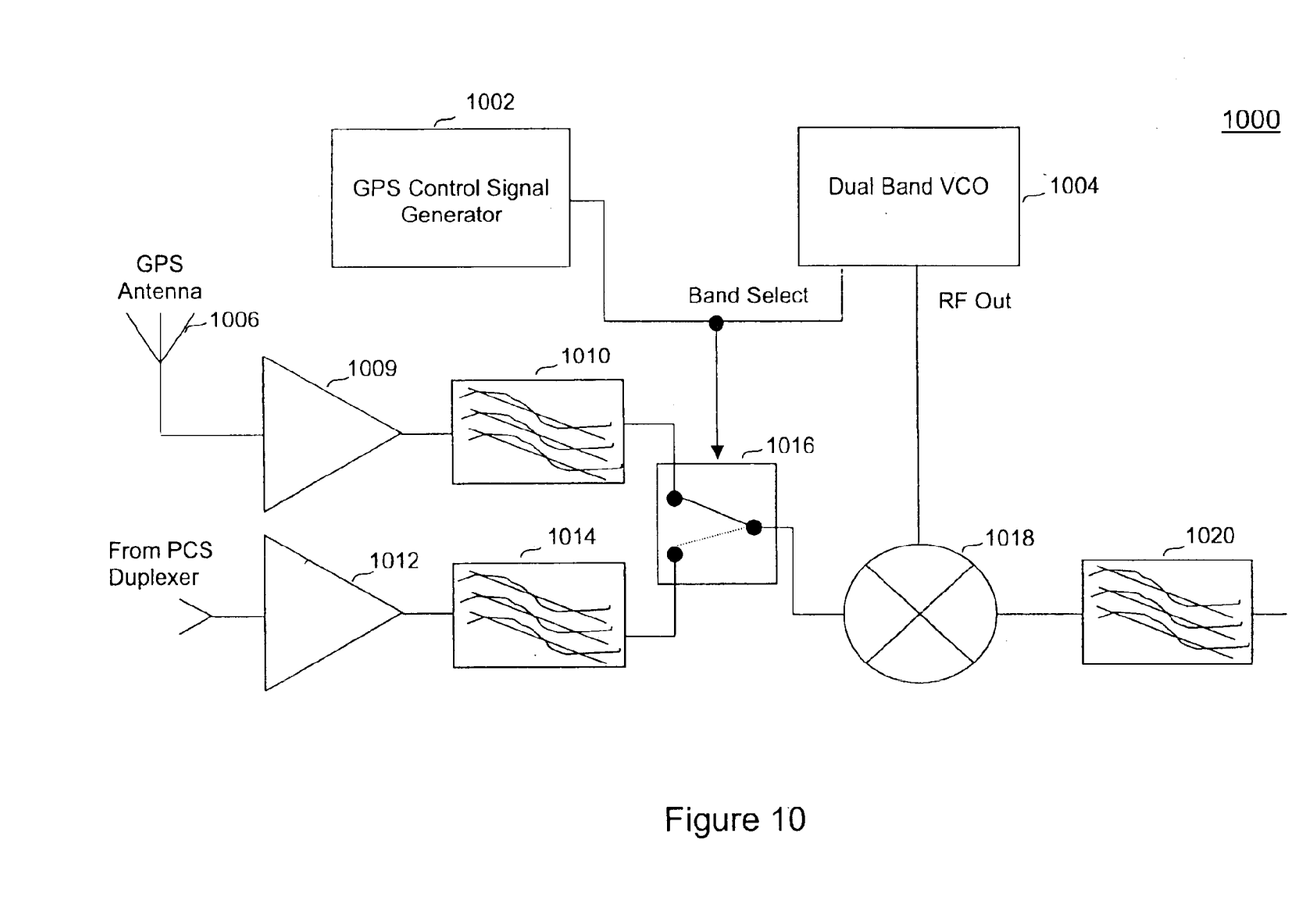
FIG. 10 is a block diagram illustrating a wireless communication device configured in accordance with one embodiment of the invention.

FIG. 10 is a diagram illustrating an example wireless communication device 1000 configured in accordance with the system and methods described herein that uses single mixer 1018 for demodulating both wireless communication signals and GPS signals. Using a single mixer 1018 provides lower cost, smaller size, and lower power consumption.

Device 1000 can further comprise a GPS antenna 1006 for receiving a GPS signal. GPS antenna 1006 can be coupled to a GPS LNA 1008 for amplifying the GPS signal. GPS LNA 1008 can be coupled to a band pass filter (BPF) 1010 for filtering the GPS signal. BPF 1010 can be coupled to a first input of a band select switch 1016. Band select switch 1016 can be configured to select between the GPS signal and a wireless communication signal, responsive to a control signal generated by a control signal generator 1002.

A LNA 1012, configured to amplify a wireless communication signal, can be coupled to a second BPF 1014. BPF 1014 can be coupled to a second input of band select switch 1016. Based select switch 1016 can in turn be coupled to a mixer 1018. Mixer 1018 can be configured to demodulate both the GPS and the wireless communication signals using a local oscillator (LO) signal generated by a programmable local oscillator 1004. The control signal selects the frequency of the local oscillator signal generated by programmable local oscillator 1004, based on whether a GPS or wireless communication signal is being received.

In an alternative embodiment, band select switch 1016 can be replaced by a diplexer.

Accordingly, a diplexer, duplexer, passive combiner or switch 412 is used to direct signals from GPS LNA 408 or PCS LNA 410 to mixer 414. Mixer 414 is then configured to mix the GPS signals or the wireless communication signals with a signal of an appropriate frequency in order to remove the RF carrier associated with each signal.

Typically, a Voltage Controlled Oscillator (VCO) is used to generate the appropriate mixing signal. Thus, such a VCO would need to be programmable so as to generate a signal of the correct frequency depending on which receiver, 408 or 410, is connected with mixer 414. It will be understood that the devices and methods described herein for reusing a modem to process GPS signals and PCS or cellular CDMA signals could also be used to process GPS signals and signals in other bands, such as, for example CDMA2000 signals.

Preferably, mixer 414 mixes the signals down to IF signals, which can be further processed in IF block 422. IF block 422 can, for example, filter the IF signals and then mix them down to baseband. If block 422 can also include A/D converts to convert the baseband signals for further processing by Modem 424. Again, Modem 424 is configured to process both the GPS signals and the wireless communication signals as described with relation to FIG. 3.

Accordingly, even further reduction in size, complexity, and cost is achieved through the reuse of various components in handset 400, while still providing full GPS capability even when handset 400 is out of range of the network. Moreover, because the GPS capabilities are not network based, GPS capability is provided without increasing network traffic.

As illustrated in FIG. 4, handset 400 can be configured to receive a plurality of wireless communication signals. For example, handset 400 can be configured for dual band, 800 MHz and 1900 Mhz, operation. In which case, handset 400 includes a second duplexer 416 for connecting a second wireless communication transmitter (not shown) and cellular CDMA LNA 418 to antenna 402. Cellular CDMA LNA 418 is then interfaced with a second mixer 420. Since the GPS signals operate in the 1500 GHz band, mixer 414 is preferably configured to receive the 1900 GHz wireless communication signals, because they are closer in frequency to the GPS signals. This makes it easier to configure the various components to handle both the GPS signals and the wireless communication signals. Reuse of a single antenna and of mixers in handsets configured to receive a plurality of wireless communication signals is, however, more fully explained in patent application Ser. No. 09/898,269 and patent application Ser. No. 09/975,124.

Even though a handset configured in accordance with the systems and methods described herein can function as an independent GPS device, such a handset can also use GPS network resources if they are available. For example, if handset 300 is operating within the network, then it can periodically receive AA and SA information from the network, e.g., PDE 112. The AA and SA information can then be stored in memory 316 and used by Modem 314 to determine the position of handset 300. Alternatively, handset 300 can just use the network resources if they are available as described in relation to FIG. 1.

Figure 11:
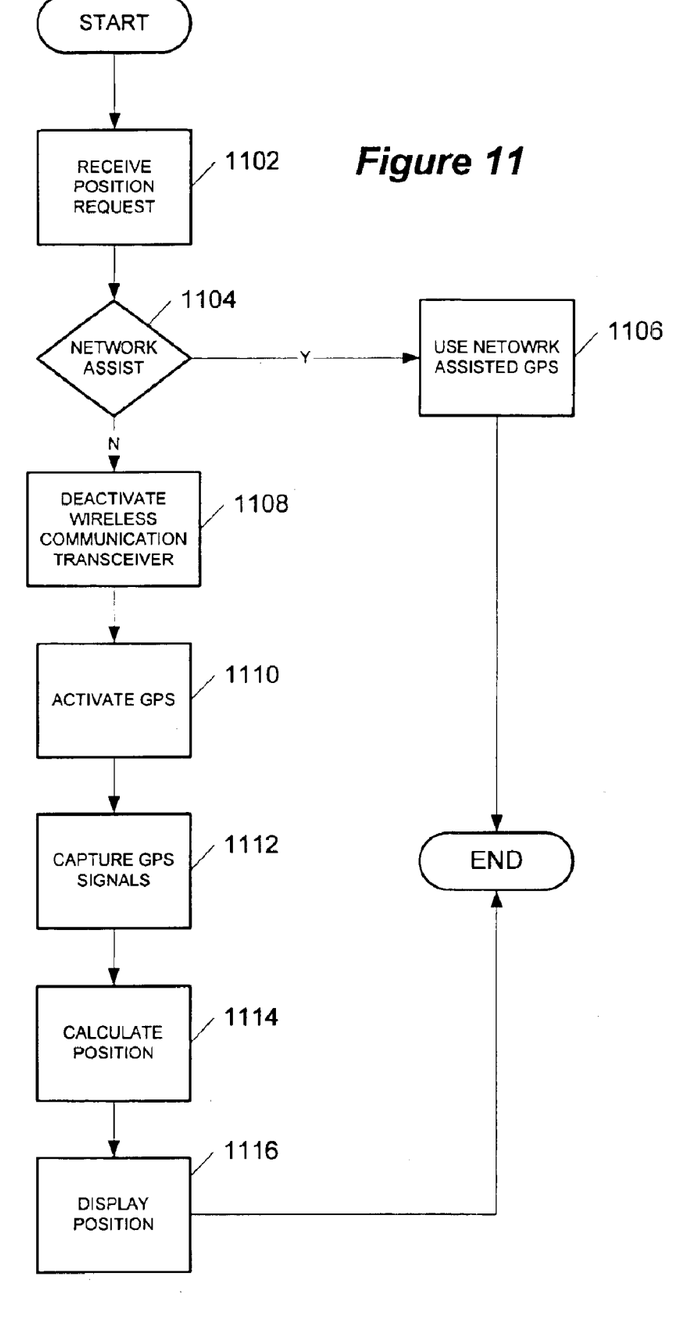
FIG. 11 is a flow chart illustrating one example process for determining the position of the wireless handset of FIG. 3 or FIG. 4.

FIG. 11 illustrates a flow chart of a process whereby a handset, such as handset 300, can use network GPS resources. First, handset 300 receives a request for position information in step 1102. For example, the subscriber may input a request to handset 300 through a user interface (not shown). Then, in step 1104, handset 300 determines if network assisted GPS capabilities are available. If they are available, then in step 1106, the network based GPS capabilities are used to determine the position of handset 300.

In the event that network based GPS capabilities are not available, then in step 1108 handset 300 deactivates wireless communication transceiver 312 and the associated processing capabilities and activates the GPS capabilities. This can, for example, comprise activating GPS receiver 304 and GPS demodulator 306. Alternatively, step 1108 can, for example, include controlling switches 404 and 412 so that the GPS circuitry is properly interfaced with antenna 402 and mixer 414. Moreover, step 1108 can require that the appropriate GPS instructions be loaded into a primary or active portion of memory 316.

In step 1112, GPS signals are captured and eventually sent to Modem 314. Then in step 1114, Modem 314 can, for example, determine the position of handset 300 from the received GPS signals. Finally, the position can be displayed to the subscriber on display 322.

The embodiments described above illustrate that the systems and methods for providing position information using a wireless communication device overcome the problems associated with conventional approaches. Thus, the systems and methods described herein allow GPS capability to be included in a handset, while reducing network traffic as well as the size, complexity and cost of the handset.

Further, while embodiments and implementations of the invention have been shown and described, it should be apparent that many more embodiments and implementations are within the scope of the invention. For example, it will be apparent that the systems and methods described herein are not limited to the specific handset architectures shown and described. Rather the architectures described above and illustrated in the figures are by way of example. Additionally, the systems and methods described herein are not limited to wireless communication handsets. It will be apparent that any wireless communication device into which GPS capability is to be integrated can benefit from the systems and methods described. Accordingly, the invention is not to be restricted, except in light of the claims and their equivalents.

What is claimed is:

1. A method for obtaining position information using a wireless communication device, comprising:

receiving a request for position information;

in response to the received request, checking to see if network assisted positioning is available;

if network assisted positioning is not available, then disabling the wireless communication receiver;

activating the GPS receiver;

receiving the GPS signals; and determining the position of a device incorporating the receiver.

2. The method of claim 1, further comprising if network assisted positioning is available:

processing network assist information related to the received GPS signals; and determining a position of a device incorporating the receiver based at least in part on the processed network assist information.

3. The method of claim 1, further comprising loading GPS instructions when the GPS receiver is activated.

4. A wireless communication device, comprising:

a GPS receiver configured to receive GPS signals;

a wireless communication transceiver configured to allow the wireless communication device to interface with a wireless communication network via a communications band; and a processor coupled with the GPS and wireless communication receivers, the processor configured to:

receive a request for position information;

in response to the received request, check to see if network assistance is available;

if network assistance is not available, then disable a wireless communication receiver portion of the wireless communication transceiver;

activate the GPS receiver;

receive the GPS signals; and process the received GPS signals to determine the position of the wireless communication device.

5. The wireless communication device of claim 4, further configured to fully process the wireless communications signals and the GPS signals, such that the wireless communication device can act as a standalone GPS receiver.

6. The wireless communication device of claim 5, wherein the processor is further configured to process network assist information related to the received GPS signals and to determine a position of the wireless communication device based at least in part on the processed network assist information.

7. The wireless communication device of claim 5, further comprising a memory coupled with the processor, the memory configured to store instructions used by the processor to control the operation of the wireless communication device.

8. The wireless communication device of claim 7, wherein the memory is further configured to store GPS instructions, and wherein the processor is configured to access the GPS instructions in order to allow the wireless communication device to act as a standalone GPS receiver.

9. The wireless communication device of claim 4, further comprising a single antenna coupled with the GPS receiver and the wireless communication transceiver, the antenna configured to receive the GPS signals and to communicate them to the GPS receiver and to receive the wireless communication signals and to communicate them to the wireless communication transceiver.

10. The wireless communication device of claim 9, further comprising a switching module configured to couple the antenna to the GPS receiver when receiving GPS signals and to the wireless communication receiver when receiving wireless communicating signals.

11. The wireless communication device claim 10, wherein the GPS receiver further comprises an antenna matching network configured to match the impedance of the GPS receiver with the antenna when the switching module is positioned to connect the GPS receiver with the antenna.

12. The wireless communication device of claim 10, wherein the wireless communication device comprises a first and second wireless communication transceivers, each configured to communicate wireless communication signals in a unique communication band, and wherein first wireless communication transceivers is interfaced with the switching module.

13. The wireless communication device of claim 12, further comprising a diplexer coupled to the antenna, the switching module, and the second wireless communication transceiver, the diplexer configured to separate signals received by the antenna and send them to the switching module or the second wireless communication transceiver depending on the frequency of the received signal.

14. The wireless communication device of claim 12, further comprising a second demodulation circuit coupled with the second wireless communication transceiver, the second demodulation circuit configured to demodulate wireless communication signals received via the second wireless communication transceiver.

15. The wireless communication device of claim 14, wherein the second demodulation circuit is coupled with a common IF block, and wherein the common IF block is further configured to mix signals demodulated by the second demodulation circuit down to baseband.

16. The wireless communication device of claim 9, further comprising a diplexer configured to couple the antenna to the GPS receiver when receiving GPS signals and to the wireless communication receiver when receiving wireless communication signals.

17. The wireless communication device of claim 9, wherein the wireless communication device comprises a first and second wireless communication transceiver, each configured to communicate wireless communication signals in a unique communication band, and wherein the wireless communication device comprises a switching module coupled to the antenna, the GPS receiver, and each of the two wireless communication transceivers, the switching module configured to couple the antenna to the GPS receiver or to one of the wireless communication transceivers depending on the position of the switching module.

18. The wireless communication device of claim 4, comprising:
  a common demodulation circuit coupled to the wireless communication transceiver and the GPS receiver, the common demodulation circuit configured to demodulate both the received GPS signals and the received wireless communication signals; and
  a common IF block, interfaced with the common demodulation circuit, the common IF block configured to mix the demodulated signals down to baseband, the wireless communication device configured to act as a standalone GPS receiver or to act as a network assisted GPS receiver when it is determined that network assistance is available from the wireless communication network.

19. The wireless communication device of claim 18, further comprising a band select switch configured to selectively couple the GPS receiver and the wireless communication receiver to the common demodulator.

20. The wireless communication device of claim 18, further comprising a dual blend VCO coupled with the common demodulator, wherein the dual band VCO is capable of being programmed to generate the correct frequency depending on whether the GPS receiver or the wireless communication receiver is coupled with the common demodulator.

21. The wireless communication device of claim 18, further comprising a diplexer configured to couple the GPS receiver or the wireless communication receiver to the common demodulator.

22. The wireless communication device of claim 4, wherein the processor is further configured to receive network assist information from the wireless communication network using the wireless communication transceiver, if network assistance is available, and process network assist information.

* * * * *